Patented July 2, 1935

2,006,798

UNITED STATES PATENT OFFICE 2,006,798

METHOD OF MAKING MARGARINE

Albert Kuba Epstein, Marvin C. Reynolds, and Benjamin R. Harris, Chicago, Ill.

No Drawing. Application February 26, 1932, Serial No. 595,424

13 Claims. (Cl. 99—13)

Our invention relates to the manufacture of margarine and some types of emulsions.

In the manufacture of edible emulsions of which margarine may be taken as a type, the initial step in the actual preparation is the formation of a fluid emulsion of suitable fats and oils with aqueous material, such as cultured milk. The emulsion is preliminarily maintained in a fluid condition by the application of heat to the blend of fats and oils. This fluid emulsion is then crystallized by bringing it in contact with a cold medium, such as a refrigerated drum or cold water. Various methods of crystallizing, all of which, however, involve the matter of cooling, are known in the art. The crystallized margarine is then processed, usually by tempering (bringing to a proper temperature so that it can be worked), working or kneading the tempered margarine together with suitable apparatus such as the machine known as a butter-worker or on rolls to produce a plastic mass; and then introducing during the kneading the salt, preservatives, coloring or other accessories, sometimes the plastic mass is blended by suitable equipment. The blending process, as usually carried on, may serve several purposes, depending upon the manner in which the process is controlled, but usually involves imparting additional flavor to the margarine and the introduction of what may be termed "accessory materials" such as salt, sodium benzoate, butter-flavor substitutes and the like.

Margarine processes as carried out heretofore, all employing the same general steps outlined above, have been costly in that there has always been a considerable waste of materials. Moreover, the product itself may suffer principally in lack of uniformity and in other respects capable of improvement as herein pointed out. There are distinctions in the practice of the so-called dry method of crystallization and the so-called wet method, although some problems are common to both methods. Our invention relates to the manufacture of margarine when practiced by either method; so for a more complete understanding of the invention, we shall first point out some of the problems peculiar to the wet and dry method.

In the wet method, the liquid emulsion is crystallized in cold water. In the practice of this method, it is always customary to employ a greater amount of aqueous emulsifying material such as cultured milk, for example, in the original emulsion that is desired in the final product. The obvious reason for this is that some of the milk constituents, such as the flavoring ingredients, are washed out of the emulsion in its contact with the crystallizing water, thereby entailing a loss of the milk constituents and a consequent decrease in the desirable butter-like flavor. When the margarine is crystallized in water, particularly if crystallized in a finely divided condition, which is the most satisfactory method, considerable amounts of the quenching water are mechanically taken up by the crystallized product. Tempering may be either in the open air or in water at a relatively higher temperature, but, in any event, this may still further deplete the relative amount of milk flavoring material in the margarine. When employing the wet crystallizing method, the working step accomplishes the removal of most of this mechanically entrapped water, but it also removes additional portions of the valuable milk constituents. Consequently, from a relatively large amount of milk initially used in the emulsion, the amount is greatly decreased and this represents an actual loss. This loss so decreases the flavor that it is necessary to add a larger percentage of milk during the initial emulsion to compensate for the subsequent losses during the crystallization and working in order to obtain a finished margarine product with the desired milk flavor and desired plasticity and spreading value. Thus, for example, if the initial liquid emulsion contains sufficient cultured milk to give it a moisture content of about 27% to 30%, then the finished margarine product, after it goes through the crystallizing, tempering, kneading, working and printing process will contain from 11 to 13% of moisture. Thus a large proportion of the valuable milk constituents is lost. If the plastic kneaded mass is blended with additional milk in a blending machine, it will not retain all of the added milk, and a large proportion of the added milk will remain in a liquid condition in the blender. Thus the milk remaining in the blender after the blending operation represents an additional loss of milk. Products made by the above process are wet and some of the milky constituents may continue to leak out on storage.

The salt, sodium benzoate and other accessory materials which are occasionally used are usually applied during the kneading and working process. These materials are water soluble and will dissolve in the free milk, milk whey and water in the blender at least as readily as they will dissolve in the aqueous constituents of the margarine. When the excess or free moisture is removed during the kneading operation, it contains relatively large amounts of salt and sodium benzoate in solution and so this represents a loss of these materials.

Thus, if it is desired that the finished margarine product shall contain, for example, about 3 to 3.5% of salt, it is necessary to add about twice as much on the butter-worker or kneading machine, and sometimes more than twice the amount of the desired salt in the finished product, namely, from 6.5 to 8%, as the salt is very soluble in the effluent liquid which is drained off. If it is desired that the finished product shall contain about .1% sodium benzoate, it is necessary to add about .2% to compensate for losses. In view of the varying temperatures of the margarine crystals when they are introduced on the butter-worker and in view of varying rate of addition of the salt and benzoate, and varying time used to work and knead the crystals into a plastic mass, and the varying amount of adhering moisture the crystals contain when placed on the butter-worker, it is difficult to obtain finished products with uniform moisture, salt and benzoate content.

The losses occasioned in the use of the dry process of crystallization are of the same character as in the wet process, but the dry process involves a mechanism which should be pointed out for a more complete understanding of the advantages of our invention.

In the so-called dry process, the emulsion is made in substantially the same way as in the wet process, but is crystallized on the outer surface of a rotating refrigerated drum. In the drum process of crystallization, a very low temperature must be employed on the drum in order to obtain instantaneous crystallization and stabilization in order to reduce the separation of some of the aqueous constituents of the milk. It is necessary to have a much lower temperature than if the oleaginous substances by themselves, without the aqueous medium, were used. This is for the reason that the specific heat of an emulsion containing the aqueous medium is higher than that of the oleaginous ingredients themselves. We have discovered that with smaller proportions of aqueous material (with all other conditions constant) crystallization can be accomplished at a higher temperature and refrigeration saved. Practically, with the usual amount of milk in the fluid emulsion, it is necessary to employ a very low temperature on the drum which will minimize the separation of some of the aqueous ingredient, that is the milk, and it is also necessary to rotate the drum slowly so as to give the margarine crystals sufficient time to chill. Thus the chilling capacity of the drum per unit time is decreased. In the dry process, therefore, as well as in the wet process, more milk than actually present in the final product is employed in the original emulsion and so there is a considerable loss of this material on the working rolls or butter-worker. In the dry process there are also losses of accessory materials when they are introduced on the butter-worker, or blender.

The principal object of our invention is to produce margarine by either the wet or dry process so as to effect a great saving of accessory materials, such as milk, salt preservatives and the like.

Another object is to carry out the dry process more satisfactorily and with a saving of refrigeration and saving of time.

Another object is to manufacture margarine by a process in which there will be substantially less loss of any of the materials employed therein.

Another object is the provision of a method for producing an improved margarine having substantially uniform flavor and other characteristics under all conditions.

Another object is to produce margarine having a more butter-like flavor by the use of smaller amounts of milk than are now customarily used.

Another object is to produce margarine with a substantially uniform moisture, salt and benzoate content, as well as with a more uniform content of other accessories.

Other objects and features of the invention will be apparent as the description proceeds.

We have discovered that we can produce margarine by a process which saves milk, salt, benzoate or other accessories and produce a finished product with the desired flavor, plasticity, spreading value and keeping properties, and at the same time more uniform than that produced heretofore. Briefly speaking, the process consists in making an initial emulsion with a very small amount of aqueous material whereby said liquid emulsion will contain much less moisture than is required in the final product. At the blending stage, we introduce additional amounts of milk or other aqueous material to bring the relative amounts of oleaginous and aqueous materials to the most desirable proportion. In the blender, preferably at the time the additional moisture or milk is introduced into the margarine, we also introduce the requisite amounts of accessory materials in substantially the exact proportions that they are to be present in the finished product. We employ in the blending step a substance having the property of facilitating the introduction of the additional aqueous material into the margarine, and which retains substantially all of the liquids in the plastic mass. By this means, we are able to insure the introduction of all of the aqueous material introduced in the blender, with the result that all of the accessory substances, such as salt and sodium benzoate, which are added in the desired amount, will also be fully taken up by the margarine and there will be no loss of these substances. The result of the practice of the entire process, therefore, is the production of a margarine, with an amount of aqueous liquid such as milk, having uniform moisture content, salt content and the like, without the substantial loss of any of these materials, substantially all of such materials employed being found in the final product in the proportions introduced.

The final product is, of course, shaped into prints and treated in the ways customary in the art. It will be understood, that any of the usual blends of fats and oils of either animal or vegetable nature, customarily used in the art, can be employed as the oleaginous constituent of our process. When we refer to oil or oleaginous constituent hereinafter, therefore, we mean any of the usual blends employed.

Considering the invention more in detail as applied to the wet process of crystallization, we can, for example, emulsify 1500 pounds of oil and fats of the proper melting point with 15 or 20 gallons of cultured milk. This fluid emulsion will contain from 8 to approximately 11% of moisture. After crystallizing this emulsion in the cold water vat, tempering it and draining and kneading out the adhering moisture which is picked up in the crystallizing vat, the product may be reduced to substantially the original moisture content of about 8 to 9%. Assume, for example, that the plastic product after kneading at this stage contains about 9% of moisture. Then to 109 pounds of this product we may add 11 pints of cultured milk in which has been dispersed a proportion of hydrophyllic substance sufficient to equal ¼ to ½% in the final margarine product; together with about 3.7 lbs. of salt, 2 oz. of sodium benzoate, and the whole mixture blended for from forty-five seconds to one and one-half minutes, depending upon the consistency of the product. The resultant oleomargarine will be dry and non-leaky and will have a moisture content of approximately 16%+ and will have a better flavor and more milk solids than that made with a larger proportion of milk, as used in the old methods. Thus there will be a saving of milk. The product will contain about 3% salt and about .1% sodium benzoate or all of the salt and benzoate added and, therefore, a saving of salt and sodium benzoate is obtained and other accessory materials, if employed.

The relative proportions given above are purely illustrative of details of the process with which we have obtained unusually good results. Good results can be obtained by modifying the proportions of milk in the initial liquid emulsion or by employing other aqueous media, such as ordinary water or water to which a small amount of salt has been added. We can also obtain unusually good results in the blender. In this case, we can still obtain a better flavor than is often possible by the practice of the old method. In any event, we can save approximately half the milk, as well as half the salt, sodium benzoate and other accessories, if used.

A still further modification of the process may be employed when the spray system of cooling is used, as described in Reynolds Patent No. 1,507,426. According to this patent, the margarine is sprayed in very finely divided form into the crystallizing vat. In this case, we can spray the oil directly into the water without preliminarily forming an emulsion and depend for the formation of the emulsion on the amount of water mechanically entrapped in the cooling vat. The amount of moisture actually combined in the form of an emulsion is relatively small and the character of the emulsion is not the most desirable when gauged by ordinary standards. But, by the use of the remaining steps of our process, this emulsion of low moisture content can be further treated to produce a desirable final margarine product having good consistency, texture and flavor.

The practice of the method when employing a crystallizing drum is not essentially different than when employing the so-called wet crystallizing process. To produce a margarine having 14 to 16% of moisture by the dry process, at least 18 to 20% of moisture must be employed in the original liquid emulsion. These percentages also assume that a very low crystallizing temperature must be employed on the drum with the attendant expense of refrigeration, and the drum must revolve sufficiently slowly so as to obtain good instantaneous crystallization, thus reducing the capacity of the drum for a given time unit. In our process, we can employ, for example, anywhere from 5 to 10% of aqueous material, such as water or milk, in the original fluid emulsion and introduce the desired remaining aqueous liquid in the blender. An emulsion with a relatively low moisture content will crystallize more readily, more evenly, at a higher temperature, with substantially no loss of moisture and in a short period of time. Thus we effect a saving not only of the milk and accessory materials, but also in refrigerating cost, and increase the capacity of the drum. The plastic mass with the relatively low milk content in then introduced into a blender together with additional milk, salt, and benzoate to give a desired moisture content, flavor, salt and benzoate content, and blended together with a hydrophyllic material, which is capable of dispersing the added milk or aqueous liquid in the margarine and retain substantially all of the added salt and benzoate to produce a substantially dry, non-leaky margarine. There are many substances which we can employ as hydrophyllic agents to assist the emulsification of the additional aqueous liquid or milk added in the blender. The property of such agent must be characterized by its ability to disperse the additional added aqueous liquid into the plastic margarine in the blender and retain substantially said liquid together with the added salt and benzoate in the finished product, without any substantial leaking. We describe such materials as hydrophyllic materials, or drying substances.

Among the substances known to have this effect are the chemical compounds disclosed in the copending application of Harris, Serial No. 474,308, filed August 9, 1930, now Patent No. 1,917,254, and which substances are therein designated as hydrophyllic lipins. These substances are in general of lipoid character, but contain a chemical group, which, in addition to the lipophyllic character of the molecule as a whole, imparts a hydrophyllic character thereto, with the result that the molecule, as a whole, has a tendency to attract and hold moisture. These substances in general may be said to be derivatives of poly-hydroxy substances having the formula

$$(RO)_v X(OH)_w (H)_z$$

wherein O and H are oxygen and hydrogen respectively, $v$, $w$ and $z$ are relatively small whole numbers, X represents the carbon skeleton of a polyhydroxy substance with groups (OH) and (RO), wherein R is an acyl, alkyl or some other substantially lipophyllic group, and wherein the ratio of $w$ to $v$ is at least one.

Examples of hydrophyllic lipins of this character are monostearyl glycerol, monopalmitic acid ester of glycerol, monocetyl ether of glycerol, monomyristyl glycerol, monolauryl glycerol, monomyristyl diethylene glycol, monomelissyl diethylene glycol, mono-oleyl di-glycerol, mono-oleyl glycerol, diethylene glycol mono-stearate, 1,6-dilauryl diglycerol, and their equivalents, mono-stearyl di-glycerol and mono-stearyl polyglycerol. We also include in this group alkyl and acyl derivatives of sugars, such as dextrose, sucrose, and derivatives of mannitol, sorbitol, polyglycerols and similar hydroxy compounds which have sufficient of the hydroxy groups esterified or combined with higher molecular weight lipophile groups to make the compound sufficiently oil wetting.

Another class of substances which have a drying effect upon the margarine are treated of in the copending application of Harris, Serial No. 566,156, filed September 30, 1931, now Patent No. 1,917,256. In the application referred to, these substances are described as anti-spattering compounds and have, in addition to their water imbibing capacity, the characteristic of preventing the spattering of margarine during frying. These substances are also possessed of two groups, one hydrophyllic and the other lipophyllic and differ from the substances termed hydrophyllic lipins in that the two groups are in a state of "balance" and so function to reduce the spattering of the margarine during frying, as disclosed in the co-pending application.

Among the compounds disclosed in Patent No. 1,917,256, the following may be taken as illustrative: cholesteryl ester of betaine hydrobromide, also hydrochloride, potassium palmityl sulphate, "sulphonated" beef stearine, monostearine sulphoacetate sodium salt (crude form), "stearic acid ester of dextrose", stearyl diethylene-glycol sulphoacetate (sodium salt), monostearyl sucrose, mannitol monopalmitate.

It may be pointed out in connection with the substances treated of in the two applications referred to that both classes of substances are hydrophyllic lipins in the sense that they contain both hydrophyllic and lipophyllic groups. In order to differentiate between the two classes of compounds, however, the terminology used has been selected.

Another class of substances which may be used for "drying" the margarine are hydrophyllic colloid substances, capable of absorbing moisture at room temperature. Among these substances are carbohydrate vegetable compounds such as gum acacia, gum tragacanth and the like. These substances and the manner in which they may be used with margarine are referred to in co-pending application, Serial No. 504,220, filed December 22, 1930.

Although we describe the details of our invention to enable those skilled in the art to practice the same, we do not restrict ourselves to the precise method described, and the invention is limited only by the scope of the appended claims.

What we claim as new and desire to protect by United States Letters Patent is:

1. The method of producing margarine which includes the steps of spraying oleaginous ingredients of the margarine into a vat of cold water to crystallize the oleaginous material and take up a relatively small amount of moisture whereby an emulsion of low moisture content is produced, treating the resulting emulsion to change it to plastic form, dispersing a relatively small amount of a hydrophyllic material with cultured milk, and blending the cultured milk into said plastic emulsion to produce a margarine product having the desired amount of moisture and a desirable flavor and aroma.

2. The method of making a substantially dry, non-leaking margarine, which comprises making an initial emulsion of oleaginous material and aqueous material, the amount of aqueous material providing less moisture content than will be present in the finished margarine product, treating said initial emulsion to form the same into a plastic mass, and thereafter blending into the plastic mass an amount of liquid milk product with a hydrophillic material, the final margarine product containing more moisture than the initial emulsion.

3. The method of making a substantially dry, non-leaking margarine which comprises making an initial liquid emulsion of oleaginous material and a liquid milk product, the amount of liquid milk product providing less moisture content than will be present in the finished margarine product, stabilizing the emulsion by crystallization, kneading it to form it into a plastic mass, and thereafter blending into the plastic mass an additional amount of liquid milk product together with a hydrophyllic material, the final margarine product containing more moisture than the initial liquid emulsion.

4. The method of making a substantially dry, non-leaking margarine which comprises making an initial liquid emulsion of oleaginous material and cultured milk, the amount of cultured milk providing less moisture content than will be present in the finished margarine product, stabilizing the emulsion by crystallization, kneading it to form it into a plastic mass and thereafter blending into the plastic mass an amount of liquid milk product together with a hydrophillic material, the final margarine product containing more moisture than the initial liquid emulsion.

5. The method of making a substantially dry, non-leaking margarine which comprises making an initial liquid emulsion of oleaginous material and aqueous material, the amount of aqueous material providing less moisture content than will be present in the finished margarine product, stabilizing the emulsion by crystallization, kneading it to form it into a plastic mass and thereafter blending into the plastic mass an amount of liquid milk product together with a hydrophillic lipin capable of preventing leaking of moisture from a plastic margarine emulsion, the final margarine product containing more moisture than the initial liquid emulsion.

6. The method of making a substantially dry, non-leaking margarine which comprises making an initial liquid emulsion of oleaginous material and aqueous material, the amount of aqueous material providing less moisture content than will be present in the finished margarine product, stabilizing the emulsion by crystallization, kneading it to form it into a plastic mass and thereafter blending into the plastic mass an amount of liquid milk product together with a hydrophillic material capable of reducing spattering of margarine during frying, the final margarine product containing more moisture than the initial liquid emulsion.

7. The method of making a substantially dry, non-leaking margarine which comprises making an initial liquid emulsion of oleaginous material and aqueous material, the amount of aqueous material providing less moisture content than will be present in the finished margarine product, treating the emulsion to change it to a plastic mass and thereafter blending into the plastic mass an amount of liquid milk product together with a relatively small proportion of a hydrophillic substance having a general formula

$$(RO)_v X(OH)_w (H)_z$$

wherein O and H are oxygen and hydrogen respectively, $v$, $w$ and $z$ are relatively small whole numbers, X represents the carbon skeleton of a polyhydroxy substance with groups (OH) and (RO) wherein R is an acyl, alkyl or some other substantially lipophillic group, and wherein the ratio of $w$ to $v$ is at least one.

8. The method of making a substantially dry, non-leaking margarine which comprises making an initial liquid emulsion of oleaginous material and liquid cultured milk product, the amount of milk product providing less moisture content than will be present in the finished margarine product, stabilizing the emulsion by crystallization, kneading it to form it into a plastic mass and thereafter blending into the plastic mass an amount of liquid milk product together with a hydrophillic material containing relatively high molecular weight mono-fatty acid ester of gylcerine, the final margarine product containing more moisture than the initial liquid emulsion.

9. The method of making a substantially dry, non-leaking margarine which comprises making an initial liquid emulsion of oleaginous margarine and aqueous material, the amount of aqueous material providing less moisture content than will be present in the finished margarine product, stabilizing the emulsion by crystallization, kneading it to form it into a plastic mass and thereafter blending into the plastic mass an amount of liquid milk product together with a relatively high molecular weight fatty acid ester of poly-glycerol, said ester having more than one free hydroxy group, the final margarine product containing more moisture than the initial liquid emulsion.

10. The method of making a substantially dry, non-leaking margarine which comprises making an initial liquid emulsion of oleaginous material and aqueous material, the amount of aqueous material providing less moisture content than will be present in the finished margarine product, stabilizing the emulsion by crystallization, kneading it to form it into a plastic mass and thereafter blending into the plastic mass an amount of liquid milk product together with a hydrophillic material together with a proportion of a water soluble accessory of a class consisting of flavoring and preserving materials, the final margarine product containing more moisture than the initial liquid emulsion.

11. The method of making a substantially dry, non-leaking margarine which comprises making an initial liquid emulsion of oleaginous material and aqueous material, the amount of aqueous material providing less moisture content than will be present in the finished margarine product, stabilizing the emulsion by crystallization, kneading it to form it into a plastic mass and thereafter blending into the plastic mass an amount of liquid milk product together with a hydrophillic material including a relatively high molecular weight mono-glyceride sodium sulpho acetate, the final margarine product containing more moisture than the initial liquid emulsion.

12. The method of making a substantially dry, non-leaking margarine, which comprises making an initial emulsion of oleaginous material and aqueous material, the amount of aqueous material providing less moisture content than will be present in the finished margarine product, treating said initial emulsion to form the same into a plastic mass, and thereafter blending into the plastic mass an amount of liquid milk product with a hydrophillic material, the final margarine product containing at least two per cent (2%) more moisture than the initial emulsion.

13. The method of making a substantially dry, non-leaking margarine which comprises making an initial liquid emulsion of oleaginous material and cultured milk, the amount of cultured milk providing less moisture content than will be present in the final product, treating the emulsion to form a plastic mass, and blending into the plastic mass an additional amount of liquid milk product and a relatively small proportion of a relatively high molecular weight fatty acid ester of glycerin with more than one free hydroxy group together with a proportion of sodium chloride, the final margarine product containing more moisture than the initial liquid emulsion.

ALBERT KUBA EPSTEIN.
MARVIN C. REYNOLDS.
BENJAMIN R. HARRIS.